United States Patent [19]
Ohnishi et al.

[11] 3,936,190
[45] Feb. 3, 1976

[54] FLUORESCENCE SPECTROPHOTOMETER FOR ABSORPTION SPECTRUM ANALYSIS

[75] Inventors: Yasushi Ohnishi; Shunichi Matsuura, both of Katsuta, Japan

[73] Assignees: The Perkin-Elmer Corporation, Norwalk, Conn.; Hitachi, Ltd., Tokyo, Japan

[22] Filed: Apr. 16, 1974

[21] Appl. No.: 461,338

[30] Foreign Application Priority Data
Apr. 16, 1973   Japan.................................. 48-42151

[52] U.S. Cl. ..................... 356/96; 250/458; 356/88
[51] Int. Cl.² ............................................ G01J 3/42
[58] Field of Search..................... 356/85, 88, 93–98; 250/458, 459, 461

[56] References Cited
UNITED STATES PATENTS
3,832,555   8/1974   Ohnishi.............................. 250/461

Primary Examiner—Alfred E. Smith
Assistant Examiner—F. L. Evans
Attorney, Agent, or Firm—S. A. Giarratana; F. L. Masselle; J. K. Conant

[57]   ABSTRACT

A fluorescence spectrophotometer having a beam splitter placed between an exit slit of an excitation monochromator and a specimen. Part of the excitation radiation is conducted to a first light quantum meter by said beam splitter and a reference photomultiplier is provided for receiving fluorescence from said first light quantum meter. A second light quantum meter is placed at the position normally occupied by a specimen cell and first and second absorbing cells are disposed in front of said first and second light quantum meters, respectively.

4 Claims, 2 Drawing Figures

FLUORESCENCE SPECTROPHOTOMETER FOR ABSORPTION SPECTRUM ANALYSIS

BACKGROUND OF THE INVENTION

1. Field of the Invention

This invention relates to fluorescence spectrophotometers and, in particular, to spectrophotometric instruments capable of generating and analyzing both emission and absorption spectra.

2. Description of the Prior Art

Conventional fluorescence spectrophotometers of early vintage comprised, in their essential constituency, a source of exciting radiant energy, usually in the ultraviolet range of the spectrum; a monochromator for converting the radiant energy to a range of wavelengths utilized to irradiate the specimen undergoing analysis and cause fluorescent emissions; and a detection system, including a second monochromator, for measurement of the intensity of fluorescent radiation emitted by the specimen. Normally, the monochromators were of the scanning type capable of generating a range of wavelengths of a continuous sequence so that the specimen could be scanned with a band of exciting wavelengths and the response to each such wavelength detected and compared and/or recorded.

The basic instrument described above suffered a major shortcoming; its results were susceptible to fluctuations of the radiation source (commonly an xenon lamp) and variations in the spectral characteristics of the monochromators. This shortcoming was overcome, at least in part, by the adoption of an optical system utilizing a reference beam of radiation and a comparison or ratio recording system. The excitation energy emanating from the first (or "excitation") monochromator was passed through a sample cell holding the specimen and thence to a detector, which generated an electrical signal processed through a signal amplifier and one channel of a ratio recorder. Simultaneously, the fluorescent emission of the sample was directed to another (the "emission") monochromator, then to a detector and subsequently, in the form of an electrical signal, through a signal amplifier to the second channel of the recorder. In this manner, fluctuations in the radiation source and variations in the spectral characteristics of the monochromators appeared in both reference and specimen channels and were cancelled from the reading.

The efficacy of the use of a reference beam to obtain a true excitation spectrum was, however, incomplete because, as can be demonstrated mathematically, its functioning depends on equality in the intensity of radiation at the respective wavelengths involved, impinging on the specimen and on the detector cell (e.g., a thermocouple, bolometer, rhodamine B fluorescent or the like). In practice, the irradiation reaching the reference detector passes through and has its intensity diminished by absorption in the specimen cell.

In order to cope with this problem, spectrum correction systems have been devised utilizing light quantum meters (or quantum counters) employing high concentration solutions of rhodamine B. A corrected excitation and emission system for fluorescence analysis is described, for example, by Poro, Anacreon, Flandreau, and Fagerson in "Corrected Fluorescence Spectra..." appearing in the Journal of the Association of Official Analytical Chemists, Vol. 56, No. 3, 1973 at pages 607–610.

In spectrophotometric analysis, it is highly desirable to utilize both emission and absorption spectra for comparison purposes. The validity of the comparison, of course, depends in large measure on the comparability of the instruments on which the analysis is carried out. Disparities, of course, are elminated or minimized if the emission and absorption spectral analyses are carried out on the same instrument and that capabilities of that instrument are equal for both types of analysis.

Unfortunately, the fluorescence spectrophotometers evolved to date, capable of obtaining a true excitation and emission spectra, are capable of only single beam operation when used for absorption spectrum analysis. This detracts from the desired accuracy of comparison with the true excitation spectrum analysis.

One solution, of course, would be to utilize separate instruments, one for the emission analysis, and the other for absorption. Aside from the added expense of a self-recording double-beam spectrometer for the absorption spectrum analysis, a precise comparison of results is difficult because, regardless of the similarity in quality and design of the instruments, they are nevertheless distinct entities which makes identical analytical parameters, e.g., slit conditions, practically impossible to achieve.

With the foregoing state of the art in view, it is the basic general object of the present invention to provide a novel instrument for spectroscopic analysis of both emission and absorption spectrum.

A more particular object is the provision of an instrument as characterized in the proceeding object in which the absorption spectrum analysis as well as true or corrected emission spectrum analysis is performed with a double beam system and the analyses are in all respects directly comparable in accuracy and precision.

Another object is the provision of a method for performing spectroscopic analysis of both fluorescene emission and absorption spectra on a single instrument with only minor modification of the optical system employed.

SUMMARY OF THE INVENTION

To the accomplishment of the foregoing and additional objects, which will become apparent as this description proceeds, the present invention contemplates a fluorescene spectrophotometer adapted for use as a double beam absorption spectrophotometer. This instrument comprises an excitation monochromator and an emission monochromator, in addition to a pair of light quantum meters. A photoelectric cell is disposed to receive the output radiation of one of the quantum meters. A beam splitter disposed in the path of radiation from the exit slit of the excitation monochromator directs a portion of such radiation to each of the light quantum meters. Respective absorption cells are placed in the optical paths between the beam splitter and the light quantum meters. Means are provided for directing radiation from the other light quantum meter through the entrance slit of the emission monochromator and a second photoelectric detector is provided to receive radiation exiting from the emission monochromator.

In another of its aspects, the invention contemplates a method of utilizing for absorption spectrum analysis, a fluorescence spectrophotometer having excitation and emission monochromators and a reference detection optical path for obtaining corrected fluorescent emission. In its normal operation, the instrument employs a beam splitter which directs a portion of the radiation from the excitation monochromator to the specimen to be analyzed and the remainder to the reference optical path. According to the method of the present invention, the instrument is converted to double beam absorption spectral analysis by substituting for the specimen a second light quantum meter and placing respective absorption cells in the optical paths of radiation from the beam splitter.

DESCRIPTION OF THE PREFERRED EMBODIMENT

Figure 1:
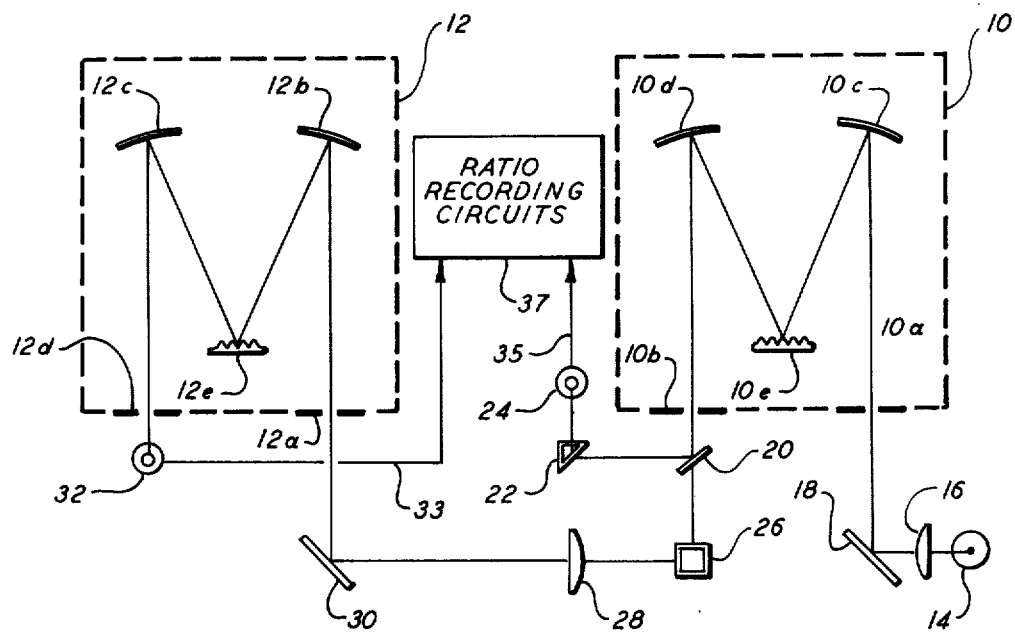
FIG. 1 is a schematic view of the relavent portion of a fluorescence spectrophotometer of a type known in the prior art.

Referring to FIG. 1, there is illustrated in schematic form portions of a conventional fluorescence spectrophotometer for obtaining a "true" or "corrected" excitation spectrum. The instrument comprises an excitation monochromator 10 and an emission monochromator 12. Conventionally, monochromator 10 includes an entrance slit 10a, an exit slit 10b, collimating mirrors 10c and 10d, and a dispersion element such as a grating 10e. Emission monochromator 12 includes corresponding parts designated by reference numerals 12a-12c.

A xenon lamp or other suitable source 14 of radiation has its emitted radiation condensed by a lens 16 and directed by a mirror 18 through entrance slit 10a to collimating mirror 10c. Collimated light is reflected by mirror 10c onto diffraction grating 10e. Dispersed light from the grating strikes mirror 10d which reflects it and focuses each collimated beam of monochromatic light as an image of entrance slit 10a in the plane of exit slit 10e.

A beam splitter 20 disposed in the path of light from exit slit 10b, directs a small portion of the exiting beam to a light quantum meter or quantum counter 22. As is well known, such quantum meters may take the form of a triangular cell filled with a concentrated solution of rhodamine B and have the property of maintaining a constant ratio of quanta absorbed from 200 to 600 um to quanta emitted at 630 um.

The quanta emitted by counter 22 impinges on a photo-multiplier tube 24 which generates a reference signal.

The major portion of the light from exit slit 10b is passed by beam splitter 20 to a sample cell 26 which, typically, takes the form of a 10m/m-square cell having four sides polished. Fluorescent radiation emitted by the specimen in cell 26 passes through a condensing lens 28 to mirror 30 which reflects the beam into the entrance slit 12a of emission monochromator 12. The beam entering monochromator 12 is reflected and dispersed in the same manner as that entering excitation monochromator 10. Thus, the beam is reflected and collimated by mirror 12b, impinges on and is dispersed by grating 12e, and each of the diffracted collimated beams of monochromatic light is reflected by mirror 12c and focused as an image of the entrance slit 12a in the plane of exit slit 12d.

Radiation exiting through slit 12d impinges on a photo-multiplier 34 which generates the output signal representative of the emission from the sample undergoing analysis. The outputs of photomultipliers 24 and 34 are amplified and directed via conductors 33, 35 to respective channels of conventional ratio recording circuits, 37, all in a manner well known in the art.

The diffraction gratings 10e and 12e are displaced, e.g., rotated, to scan a range of wavelengths at the exit slits. As the proportion of the radiation directed to the reference detector and the specimen by beam splitter 20 is dependent on wavelength, "programmed potentiometers" not shown, mechanically linked to the grating displacement mechanism are provided; these provide correction signals to amplifiers in the signal circuits to compensate for this wavelength dependency. For additional information on this known arrangement, reference may be had to the aforementioned publication by Poro et al.

Figure 2:
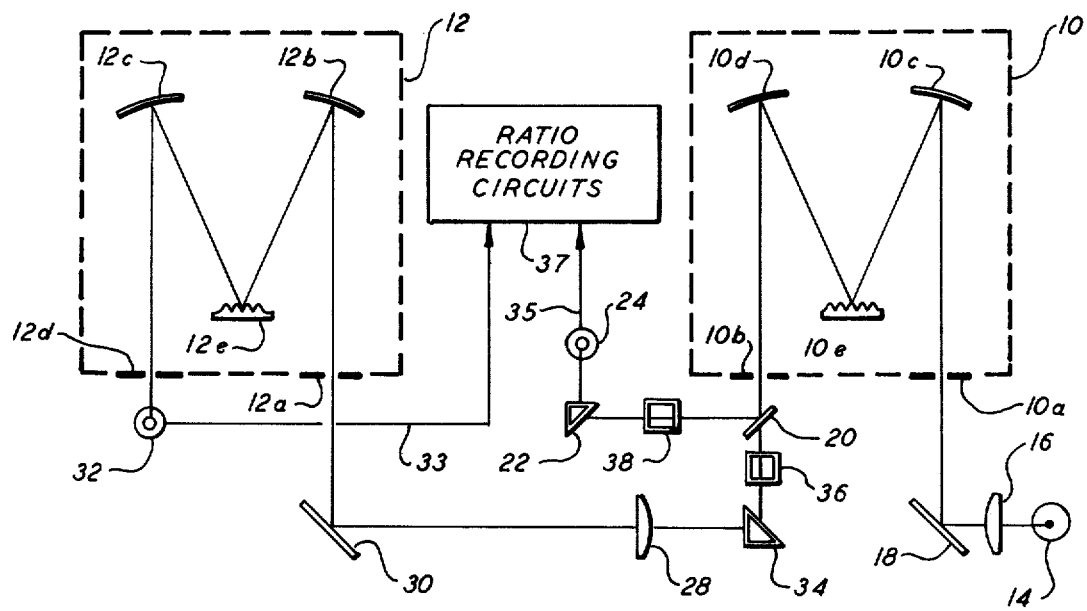
FIG. 2 is a schematic view of the instrument shown in FIG. 1 embodying the present invention.

Referring now to FIG. 2, the instrument of FIG. 1 is shown as modified in accordance with the present invention to obtain a true absorption spectrum comparable to a double beam absorption spectrum instrument. Like reference numerals are applied to like parts in the two figures; consequently, it will be necessary to describe only the modifications. In FIG. 2, the sample cell 26 (FIG. 1) is replaced by an additional light quantum counter 34 and an absorption cell, 36 and 38, respectively, is disposed in each beam emanating from beam splitter 20, i.e., between the beam splitter and the respective quantum counters. The wavelength of the emission monochromator is set to a wavelength at which only the fluorescence from light quantum meter 34 is received, e.g., approximately 630 um where rhodamine B is used as the quantum counter.

As already alluded to, a programmed potentiometer is provided for compensation of wavelength dependency in the optical system components, specifically, beam splitter. More specifically, in order to correct components by which the intensity ratios at the respective wavelengths between the excitation radiation incident on light quantum meters 22 and 34 are not precisely equal due to the spectral characteristics of the beam splitter, etc., there is provided a well-known function generator which consists of a potentiometer (not shown) with a number of intermediate taps coupled to the grating drive mechanism (not shown) of excitation monochromator 10, and having variable resistors connected thereto. A comparable arrangement may be provided for emission monochromator 12 as shown in FIG. 1 of the aforementioned publication by Poro et al.

With the function generator, calibration is made so that, when the excitation wavelength is scanned with the absorbing cells 36 and 38 absent, the recorded value always indicates 100 percent. Subsequently, a solvent is put into the absorbing cell 36 and a specimen into the absorbing cell 38, the excitation wavelength is scanned, the output of the photomultiplier 32 is amplified, and thereafter, the amplified signal is recorded via a logarithmic circuit, whereby an absorption spectrum by a double beam can be produced.

Thus, a double beam absorption spectrum can be easily measured in this manner in a fluorescence spectrophotometric instrument in which the beam splitter is provided behind the exit slit of the excitation monochromator and which is equipped with a reference photomultiplier, and absorbing cells 36, 38, and the light quantum meters 22 and 34 are disposed in both the beam paths. Since the true excitation spectrum and the absorption spectrum can be measured using the identical excitation monochromator, comparison of both the spectra can be accurately performed.

The cell of the light quantum meter need not be triangular but a rectangular one may be obliquely placed. Although a quartz plate is generally employed for beam splitter 20, it may also be a lattice mirror or half-mirror.

As apparent from the foregoing explanation, in accordance with the present invention, the measurement of the absorption spectrum by the double beam is possible with a spectrophotometer for fluorescence analysis, and the true excitation spectrum and the absorption spectrum are obtained with a single instrument. Moreover, the measurements can be made under the same measuring conditions, such as the spectrum width, so that comparison of both the spectra can be carried out easily and reliably.

What is claimed is:

1. A fluorescence spectrophotometer adapted for analysis of absorption spectra, comprising:
    a. first and second monochromators having respective entrance and exit slits;
    b. a source of excitation radiation and means for directing radiation from said source into the entrance slit of said first monochromator;
    c. a pair of light quantum meters;
    d. a photoelectric detector disposed to receive a radiation output from one of said light quantum meters;
    e. a beam splitter disposed in the path of radiation emanating from the exit slit of said first monochromator and directing a portion of such radiation to each of said light quantum meters;
    f. respective absorption cells disposed in the paths of radiation from said beam splitter to said light quantum meters;
    g. means for directing radiation output from the other of said light quantum meters through the entrance slit of the second monochromator; and
    h. a second photoelectric detector disposed to receive radiation from the exit slit of said second monochromator.

2. A spectrophotometer according to claim 1, wherein said light quantum meters contain rhodamine B fluorescein and said photoelectric detectors are photomultiplier tubes.

3. A spectrophotometer according to claim 1 including ratio circuit means for comparing the output of said photoelectric detectors.

4. A method of utilizing for absorption spectrum analysis, a fluorescence spectrophotometer comprising excitation and emission monochromators, a reference detection optical path including a light quantum meter and photoelectric detector, an emission spectrum optical path including a specimen location and means for directing radiation emission from a sample at said location through said emission monochromator to a second photoelectric detector and beam splitting means for directing part of the radiation from the excitation monochromator along said reference detector path and the remainder to said specimen location, said method comprising the steps of:
    a. disposing a second light quantum meter at said specimen location so that radiation therefrom is directed through said emission monochromator; and
    b. disposing an absorption cell in the optical path between said beam splitting means and first light quantum meter; and
    c. disposing in the optical path between said beam splitting means and said second light quantum meter a second absorption cell.

* * * * *